United States Patent
Ikushima

(10) Patent No.: US 10,441,967 B2
(45) Date of Patent: Oct. 15, 2019

(54) SYRINGE ATTACHMENT/DETACHMENT MECHANISM AND DEVICE PROVIDED WITH MECHANISM

(71) Applicant: MUSASHI ENGINEERING, INC., Tokyo (JP)

(72) Inventor: Kazumasa Ikushima, Tokyo (JP)

(73) Assignee: MUSASHI ENGINEERING, INC., Mitaka-shi, Tokyo (JP)

( * ) Notice: Subject to any disclaimer, the term of this patent is extended or adjusted under 35 U.S.C. 154(b) by 329 days.

(21) Appl. No.: 15/329,359

(22) PCT Filed: Jul. 17, 2015

(86) PCT No.: PCT/JP2015/070504
§ 371 (c)(1),
(2) Date: Jan. 26, 2017

(87) PCT Pub. No.: WO2016/017453
PCT Pub. Date: Feb. 4, 2016

(65) Prior Publication Data
US 2017/0225188 A1    Aug. 10, 2017

(30) Foreign Application Priority Data

Jul. 30, 2014  (JP) ................................ 2014-154387

(51) Int. Cl.
*B05C 11/00*     (2006.01)
*B05C 11/11*     (2006.01)
(Continued)

(52) U.S. Cl.
CPC ................ *B05C 11/11* (2013.01); *B05C 5/00* (2013.01); *B05C 5/02* (2013.01); *B05C 5/0212* (2013.01);
(Continued)

(58) Field of Classification Search
None
See application file for complete search history.

(56) References Cited

U.S. PATENT DOCUMENTS 5,010,841 A * 4/1991 Stewart ................. B05C 5/0208
                                                            118/113
D738,495 S    9/2015 Strong et al.
(Continued)

FOREIGN PATENT DOCUMENTS

JP    2003-175353 A    6/2003
JP    2009-539607 A    11/2009
(Continued)

*Primary Examiner* — Charles Capozzi
(74) *Attorney, Agent, or Firm* — Westerman, Hattori, Daniels & Adrian, LLP

(57) ABSTRACT

A syringe attachment/detachment mechanism enables a syringe to be easily attached to and detached from a discharge device without causing twisting of a tube, and enabling the syringe and an adapter to be fixedly held in a desired orientation. In the syringe attachment/detachment mechanism and the device provided with the mechanism, the mechanism being adapted for a discharge device to which a syringe including an attachment part and an upper connection part is attached through screwing, the attachment part includes an inner cylindrical portion having a small-diameter opening, an outer cylindrical portion surrounding the inner cylindrical portion, and a screw portion. The attachment/detachment mechanism includes a support member including a cylindrical insertion portion into which the inner cylindrical portion is inserted, and having a channel formed therein for communication between the small-diameter opening and a nozzle of the discharge device. A rotation member includes a screw portion.

9 Claims, 6 Drawing Sheets

(51) Int. Cl.
    *B05C 5/00*     (2006.01)
    *F16L 37/24*     (2006.01)
    *B05C 5/02*     (2006.01)
    *B05C 13/00*     (2006.01)
    *F16L 19/04*     (2006.01)

(52) U.S. Cl.
    CPC .............. *B05C 11/00* (2013.01); *B05C 13/00* (2013.01); *F16L 37/24* (2013.01); *F16L 19/04* (2013.01)

(56) References Cited

U.S. PATENT DOCUMENTS

| | | |
|---|---|---|
| D750,228 S | 2/2016 | Strong et al. |
| 2007/0287965 A1 | 12/2007 | Strong et al. |
| 2010/0156970 A1* | 6/2010 | Ikushima ................ B05B 12/06 347/8 |
| 2010/0294810 A1* | 11/2010 | Ikushima .............. B05C 5/0237 222/309 |
| 2012/0209243 A1* | 8/2012 | Yan ........................ A61M 5/008 604/500 |

FOREIGN PATENT DOCUMENTS

| | | |
|---|---|---|
| JP | 2013-52350 A | 3/2013 |
| JP | 2013-107034 A | 6/2013 |

\* cited by examiner

SYRINGE ATTACHMENT/DETACHMENT MECHANISM AND DEVICE PROVIDED WITH MECHANISM

TECHNICAL FIELD

The present invention relates to a mechanism enabling a liquid material reservoir (syringe) for a discharge device to be easily attached and detached, and further relates to a device provided with the mechanism. More particularly, the present invention relates to a mechanism for a connection portion with respect to a pump that is used to discharge a liquid material, and further relates to a device provided with the mechanism.

BACKGROUND ART

Known discharge devices (so-called dispensers) for discharging a liquid material from a discharge port of a nozzle in communication with a liquid material reservoir (syringe) are mainly divided into the air type and the mechanical type. An air type dispenser mountable to an XYZ-axis drive device is generally constituted such that a nozzle is directly mounted to the lower end side of the syringe, and that compressed gas is supplied from the upper end side of the syringe to discharge the liquid material from the nozzle. On the other hand, a mechanical type dispenser is generally constituted such that a pump (e.g., a screw pump or a plunger pump) is mounted to the lower side of the syringe, and that the liquid material is discharged from a nozzle, which is mounted to a pump outlet end, by the action of the pump. Moreover, in the case of the mechanical type, a tubing line through which the compressed gas is supplied to the syringe is also connected to the opposite side (upper side) relative to the side to which the pump is connected, as in the case of the air type, for the purpose of assisting supply of the liquid material to the pump.

In the mechanical type dispenser, the syringe and the pump are connected, for example, by disposing a block-shaped connection member (see, e.g., Patent Document 1), or by employing a tubing line (i.e., a tube or a pipe) (see, e.g., Patent Document 2).

As disclosed in Patent Documents 3 and 4, a general syringe includes a barrel portion having a cylindrical shape, a screw portion formed at one end of the syringe, and a flange portion formed at the other end. A nozzle or a pump is connected to the syringe on the side where the screw portion is formed, and a tubing line (tube) through which compressed gas is supplied is connected through an adapter to the syringe on the side where the flange portion is formed.

CITATION LIST

Patent Documents

Patent Document 1: Japanese Patent Laid-Open Publication No. 2013-107034
Patent Document 2: Japanese Patent Laid-Open Publication No. 2013-52350
Patent Document 3: Japanese Patent Laid-Open Publication No. 2003-175353
Patent Document 4: Japanese Patent Laid-Open Publication No. 2009-539607

SUMMARY OF INVENTION

Technical Problem

In order to attach the syringe, which includes the screw portion formed at the one end thereof, to a connection member extending laterally from a body of a discharge device, a syringe body needs to be rotated for the attachment through screwing. However, when the syringe is rotated after attaching the adapter to which the tube for supplying the compressed gas is connected, there is a problem that the tube twisted with the rotation of the syringe may be tangled or damaged. Moreover, there is further a possibility that a relatively weak portion of the syringe, such as the screw portion, may be deformed or damaged with a motion of the twisted tube restoring to its original state. When the syringe is detached from the connection member of the discharge device, a similar problem to that in the case of attaching the syringe also occurs because the syringe body has to be rotated.

Meanwhile, the syringe is not circular when viewed from above, and the upper connection part has a shape protruding from the cylindrical barrel body (so as to form the flange portion in an elongate hexagonal or more polygonal shape, or the flange portion substantially in an elliptic or rectangular shape, for example). In which orientation the upper connection part (flange portion) and the adapter are fixed depend on how a screw portion of the connection member is formed (it is technically difficult to machine thread grooves in metal-made connection members in a manner of always specifying the same start point for each of the thread grooves). Also in the case of forming screw portions in resin-made syringes, variations occur in formation states of the screw portions depending on makers. Accordingly, when the syringe is attached through screwing, the flange portion and the adapter are sometimes not positioned in the desired orientation. Thus, there is a problem that the flange portion and the adapter may be protruded in a direction perpendicular to the connection member, and that an overall width of the discharge device may be increased. Such a problem is especially serious in the case of arranging the plurality of discharge devices (dispensers) side by side.

Hence an object of the present invention is to provide a syringe attachment/detachment mechanism and a device provided with the mechanism, which can solve the above-mentioned problems.

Solution to Problem

In general, a commercially available syringe is made of a resin material, and it has an elongate upper connection part (flange portion) that extends in one straight line. A custom-ordered syringe has to be used to make the upper connection part (flange portion) rotatable relative to a barrel of the syringe. However, the custom-ordered syringe is problematic in increasing the cost. To cope with such a situation, the inventor has designed, through intensive studies, a mechanism enabling a syringe, which may be the commercially available syringe, to be attached to the discharge device through screwing without rotating the syringe. Thus, the present invention is constituted by the following technical features.

According to the present invention, there is provided a syringe attachment/detachment mechanism (1) for a discharge device to which a syringe (6, 206) including an attachment part (10) and an upper connection part (7) is attached through screwing, wherein the attachment part (10) includes an inner cylindrical portion (62) having a small-diameter opening (68), an outer cylindrical portion (63) surrounding the inner cylindrical portion (62), and a screw portion (65), the attachment/detachment mechanism (1) includes a support member (20) including a cylindrical insertion portion (23) into which the inner cylindrical portion (62) is inserted, and having a channel (24, 25) formed therein for communication between the small-diameter opening and a nozzle of the discharge device, a rotation member (40) including a screw portion (46) engaging with the screw portion (65) of the attachment part is provided to be rotatably fitted over the insertion portion (32), and the syringe is attached with rotation of the rotation member (40).

In the syringe attachment/detachment mechanism (1) described above, the support member (20) may have an annular groove formed in a lateral peripheral surface thereof, the rotation member (40) may have a lateral insertion hole positioned in an opposing relation to the annular groove, and the attachment/detachment mechanism may further include one or more slip-off preventive members each extending through both the lateral insertion hole and the annular groove.

In the syringe attachment/detachment mechanism described above, the inner cylindrical portion (62) may have a tapered outer peripheral surface gradually thinning toward the small-diameter opening (68), and the insertion portion (23) may be provided with an upper insertion hole (26) having a tapered inner peripheral surface that is contacted with the tapered outer peripheral surface of the inner cylindrical portion (62).

In the syringe attachment/detachment mechanism (1) described above, the support member (20) may include a support portion (22) having a larger diameter than the insertion portion (23), and the rotation member (40) may include a raised portion (42, 43) having a through-hole (44) into which the insertion portion (23) is inserted, an operating portion (41) having a larger diameter than the raised portion, and a recess (45) into which the support portion (22) is fitted. In the above case, preferably, a lateral surface of the operating portion (41) is treated with a process for anti-slipping.

According to the present invention, there is further provided a discharge device (2) comprising a nozzle having a discharge port, a liquid chamber that is communicated with the discharge port, and that is supplied with a liquid material, a main body (12) including the liquid chamber formed therein, a coupling member (15) connected to the main body and including a channel (16) formed therein to be communicated with the nozzle, a propulsion force applying member arranged in the liquid chamber and giving a propulsion force necessary for discharge to the liquid material, a propulsion-force applying member drive source for operating the propulsion force applying member, and a discharge control unit, wherein the discharge device includes the above-described syringe attachment/detachment mechanism according to the present invention.

According to the present invention, there is still further provided an application apparatus (100) comprising the above-described discharge device according to the present invention, a compressed gas source (102) that supplies compressed gas for applying pressure to a syringe, the syringe (6, 206) including an attachment part (10) and an upper connection part (7), and being attached to the syringe attachment/detachment mechanism through screwing, an adapter (8) connected to a tube that communicates the syringe and the compressed gas source with each other, and being mounted to the upper connection part, a worktable (103) on which an application object is placed, XYZ-axis drive devices (111, 112, 113) that relatively move the discharge device (2) and the worktable (103), and an application control unit that controls operations of the XYZ-axis drive devices. Preferably, the upper connection part of the syringe is constituted by an elongate flange (72) extending in one straight line.

In the application apparatus (100) described above, the discharge device (2) may be constituted by the plurality of discharge devices arranged in such a state that the coupling members (15) are positioned parallel to each other.

Advantageous Effects of Invention

According to the present invention, since the syringe can be easily attached to and detached from the discharge device without causing twisting of a tube through which compressed gas is supplied, the tube and the syringe can be avoided from being damaged.

Furthermore, since the syringe and the adapter can be fixedly held in the desired orientation when attached and detached, an overall width of the discharge device (i.e., a width thereof in a direction perpendicular to a coupling member) can be held relatively small by adjusting the orientation of the upper connection part and the adapter.

Figure 4:
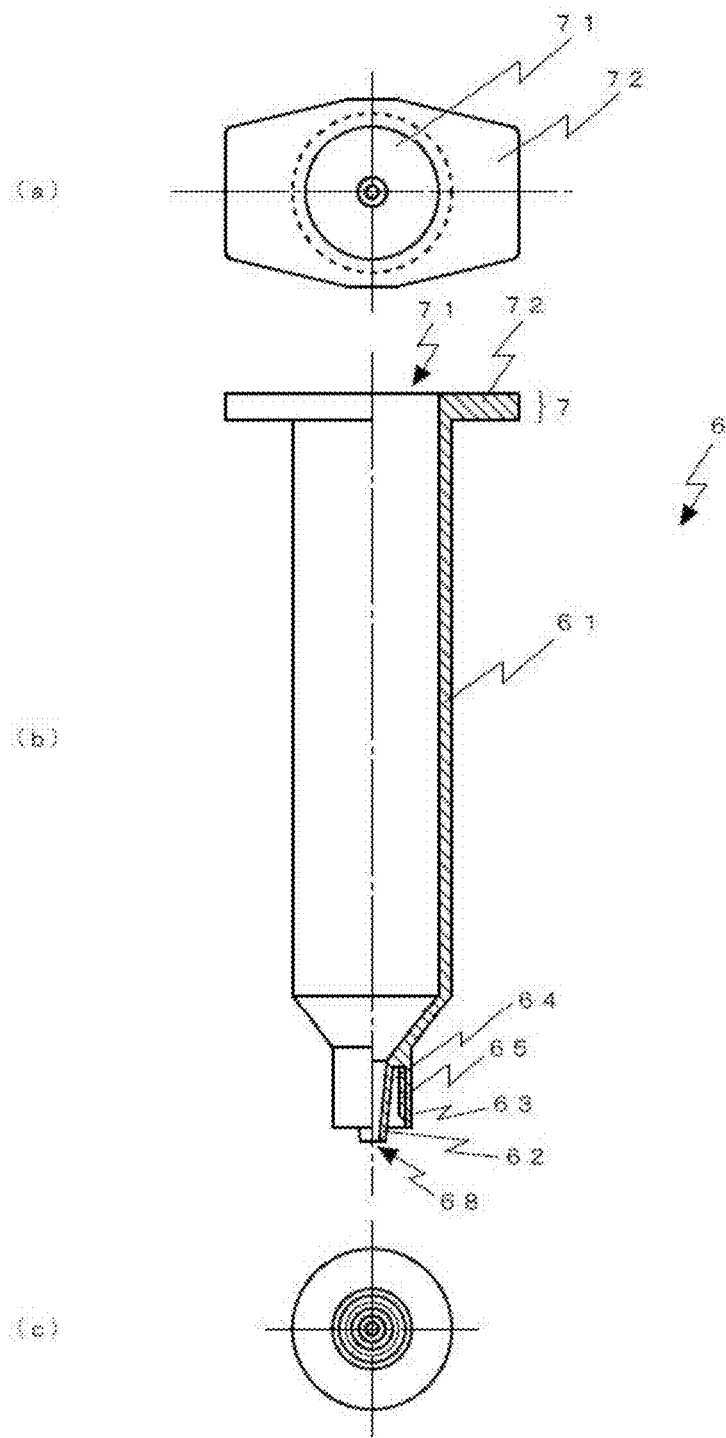

(a) of FIG. 4 is a plan view of the syringe, (b) of FIG. 4 is a side view, sectioned in a one-side half, of the syringe, and (c) of FIG. 4 is a bottom view of the syringe.

Figure 5:
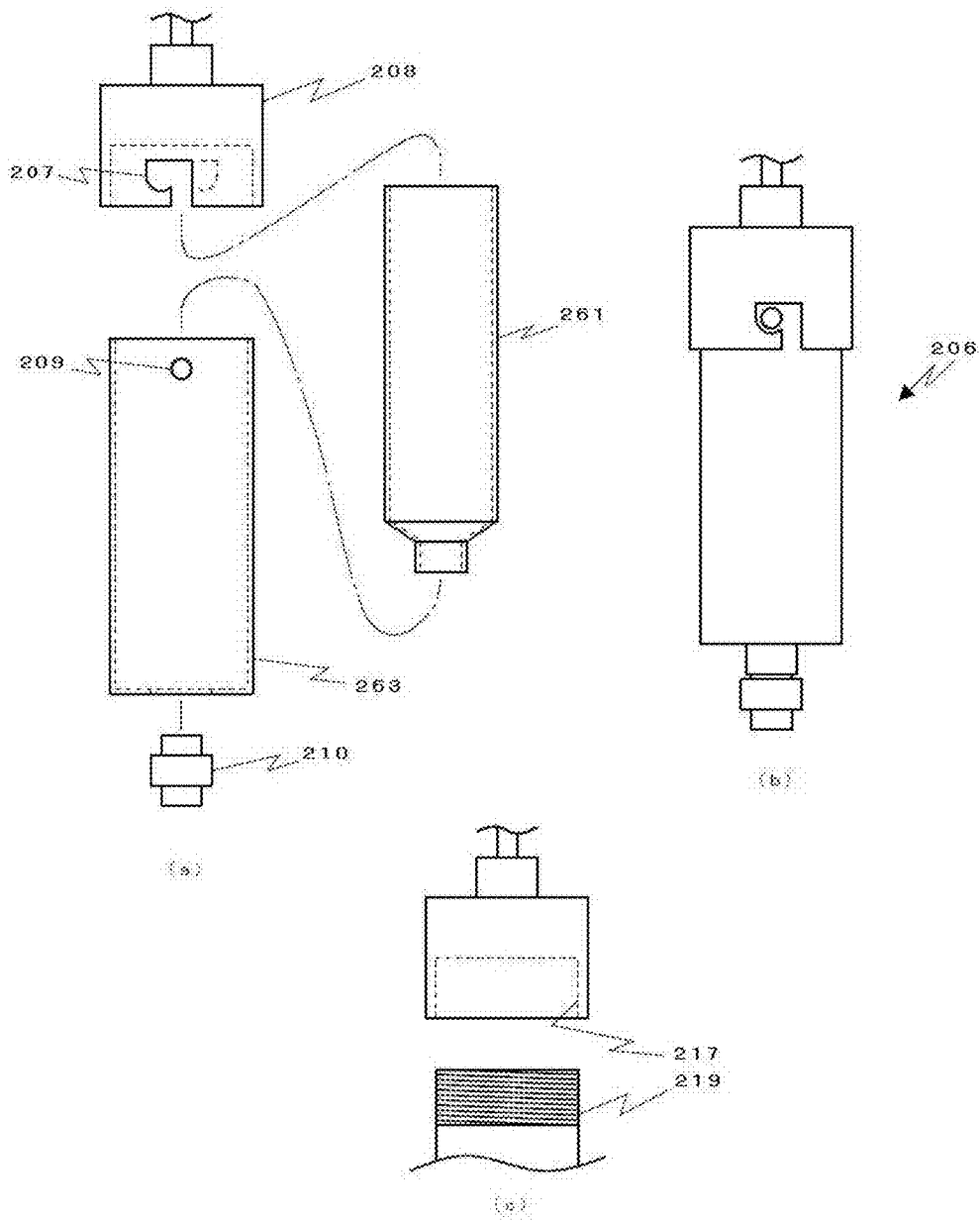

FIG. 5 illustrates a syringe according to a modification. More specifically, (a) of FIG. 5 is a side view referenced to explain a component formation in an embodiment in which a cartridge cap and a hook are used for attachment and detachment of the syringe, (b) of FIG. 5 is a side view representing an assembled state of the embodiment illustrated in (a) of FIG. 5, and (c) of FIG. 5 is a side view referenced to explain a component formation in an embodiment in which the cartridge cap and a screw portion are used for attachment and detachment of the syringe.

Figure 6:
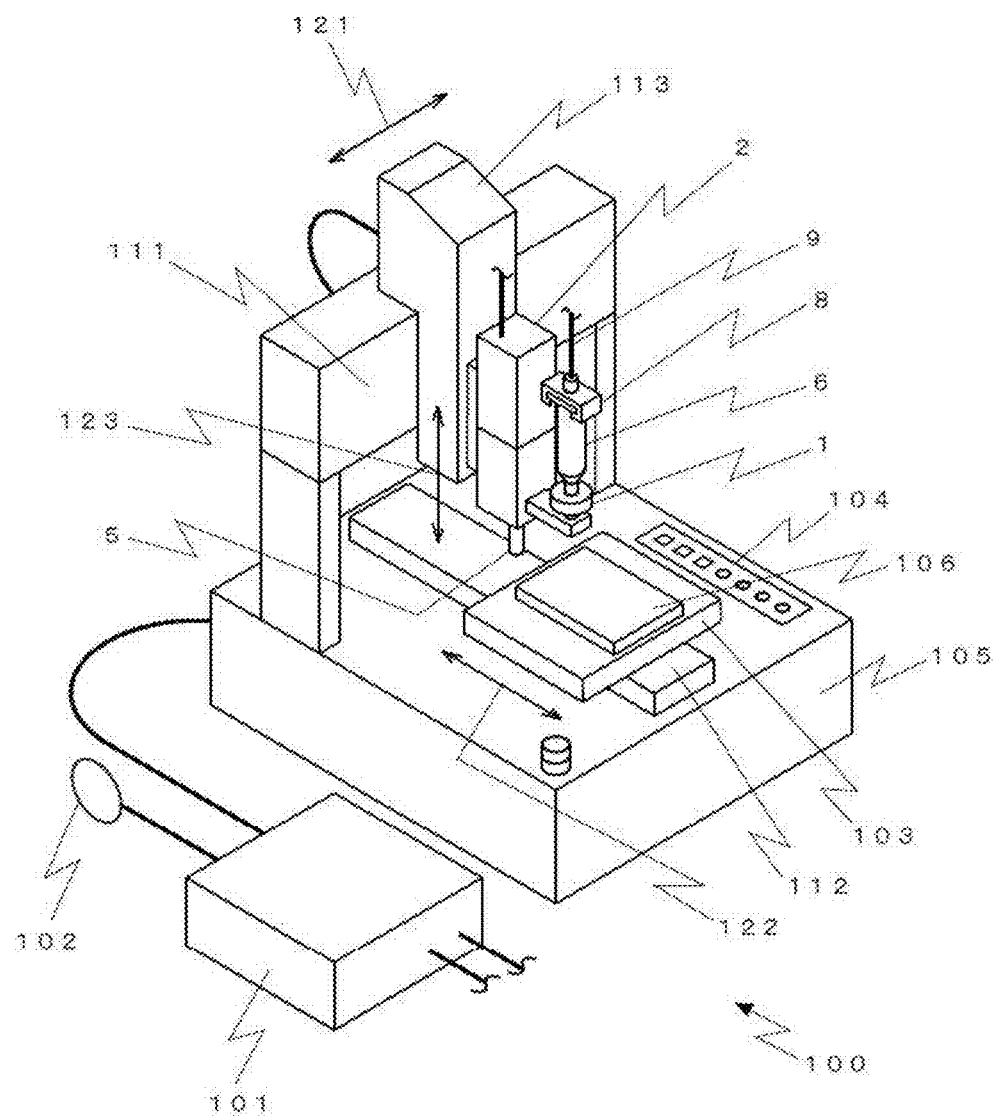

FIG. 6 is a perspective view of an application device provided with the liquid material discharge device according to the present invention.

DESCRIPTION OF EMBODIMENTS

Embodiments for carrying out the present invention will be described below.

<Constitution>

Figure 1:
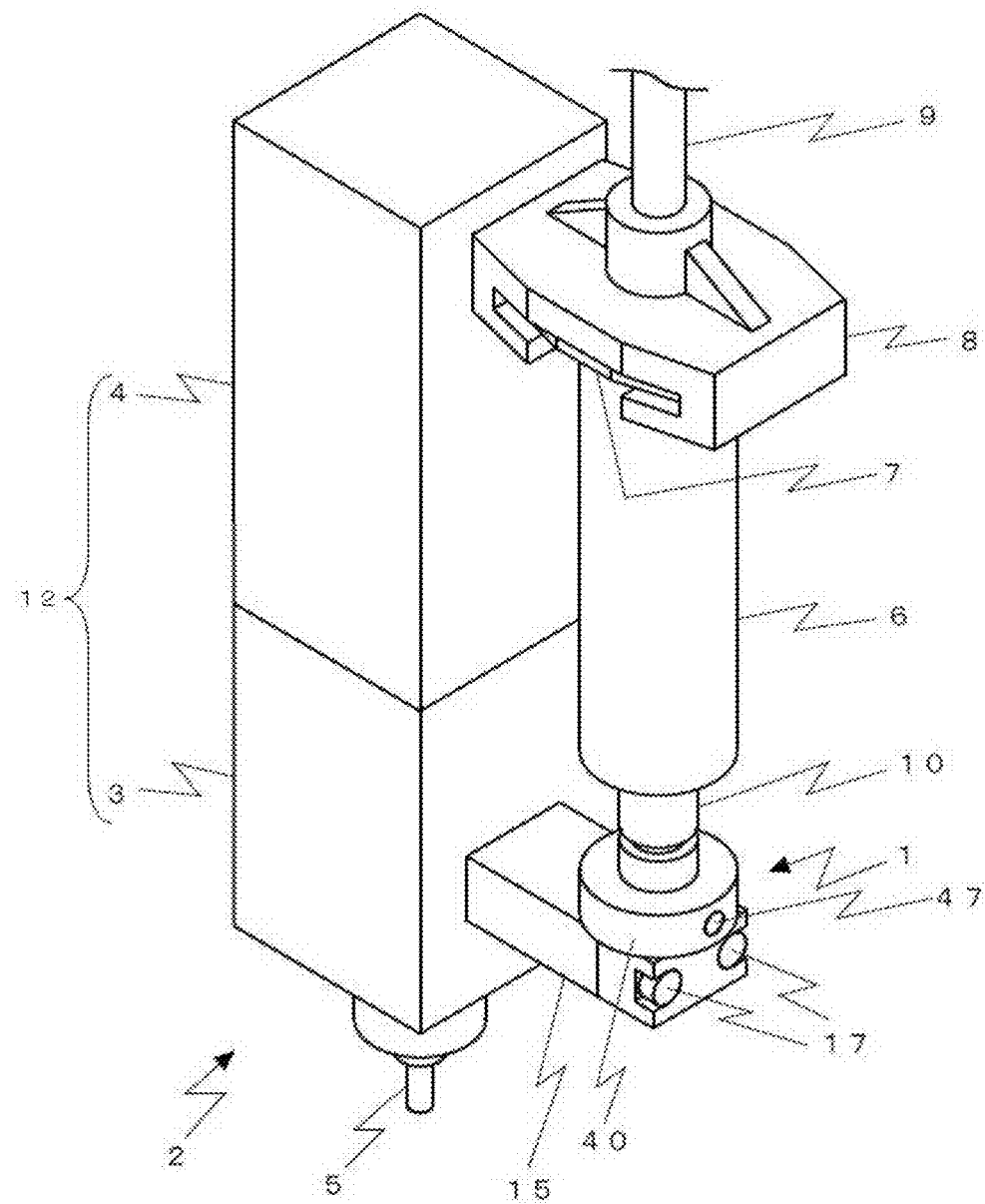
FIG. 1 is a perspective view of a liquid material discharge device provided with an attachment/detachment mechanism according to the present invention.

FIG. 1 illustrates a liquid material discharge device 2 provided with an attachment/detachment mechanism 1 according to the present invention.

The liquid material discharge device 2 (dispenser) provided with the attachment/detachment mechanism 1 according to the present invention is of the mechanical type, and it includes a main body 12 constituted by a pump section 3 and a pump drive section 4, and a nozzle 5.

A pump incorporated in the pump section 3 may be of, for example, the screw type rotating a screw that includes a spiral blade formed on a surface of a rod-like member along an axial direction, and feeding a liquid material by the blade with rotation of the screw, thus discharging the liquid material, or the plunger type moving a plunger, which slides in close contact with an inner surface of a metering portion including a nozzle at its tip end, through a desired distance, thus discharging the liquid material. A propulsion force applying member, e.g., the screw or the plunger, is arranged in a liquid chamber, which is communicated with a discharge port and to which the liquid material is supplied, in order to give the liquid material with a propulsion force necessary for discharging the liquid material. The nozzle 5 extending in a vertical direction is mounted to the outlet side of the pump section 3, and the liquid material 70 is discharged from the discharge port that is provided at a lower end of the nozzle 5.

A drive device for driving the pump incorporated in the pump drive section 4 includes, for example, a motor for driving the plunger or the screw, a motor for driving a switching valve, a spring for biasing the plunger, and a compressed gas supply source.

The pump section 3 is in fluid-communication with a reservoir 6 (syringe) that stores the liquid material, and the liquid material is supplied to the pump section 3 from the syringe 6. At an upper end of the syringe 6 illustrated in FIG. 1, by way of example, an elongate upper connection part 7 extending in one straight line is formed, and an adapter 8 having a substantially similar shape to that of the upper connection part 7 can be attached to the upper connection part 7 in a detachable manner. The adapter 8 is connected to a flexible tube 9 through which compressed gas is supplied.

On the other hand, an attachment part 10 including a screw portion 65 formed in its inner surface is provided at a lower end of the syringe 6. The syringe 6 can be attached to the attachment/detachment mechanism 1 by fitting the attachment part 10 through screwing. The attachment/detachment mechanism 1 and a metal-made coupling member 15 are fixed to the pump section 3 in a detachable manner with use of fixing members 17 such as screws. The attachment/detachment mechanism 1 and the coupling member 15 are collectively called a connection member in some cases.

When an existing discharge device is of the type that an attachment/detachment mechanism and a coupling member can be attached and detached with use of fixing members such as screws, the advantageous effects of the present invention can be easily obtained by replacing the existing attachment/detachment mechanism with the attachment/detachment mechanism 1 of the present invention.

FIG. 4 is a side sectional view of the syringe 6. The syringe 6 includes a storage cylinder 61, an inner cylindrical portion 62, an outer cylindrical portion 63, a connection groove 64, a syringe screw portion 65, and the upper connection part 7. The storage cylinder 61 stores the liquid material. The inner cylindrical portion 62 has a smaller diameter than the storage cylinder 61 and forms a storage space inside by communicating with the storage cylinder 61. The outer cylindrical portion 63 is formed in continuity with an outer peripheral surface of the storage cylinder 61. The connection groove 64 is formed between the outer cylindrical portion 63 and the inner cylindrical portion 62. The syringe screw portion 65 is formed in the connection groove 64. The inner cylindrical portion 62, the outer cylindrical portion 63, the connection groove 64, and the syringe screw portion 65 constitute the attachment part 10. An outlet channel 66 is formed inside the inner cylindrical portion 62 (see FIG. 2), and a small-diameter opening 68 is formed at a lower end of the inner cylindrical portion 62. In the illustrated embodiment, the inner cylindrical portion 62 has a tapered shape gradually thinning toward a tip end. However, the inner cylindrical portion 62 may be constituted as a non-tapered cylindrical portion having the same diameter from an upper end to a lower end.

The upper connection part 7 is constituted by a large-diameter opening 71 formed at a center of an upper end portion of the storage cylinder 61, and a pair of flanges 72 extending from the upper end portion of the storage cylinder 61 laterally to the right and the left. The pair of flanges 72 have a symmetrical shape with respect to the center of the large-diameter opening 71.

FIG. 5 illustrates a syringe 206 according to a modification. More specifically, FIG. 5(*a*) is a side view referenced to explain a component formation in an embodiment in which a cartridge cap and a hook are used for attachment and detachment of the syringe, FIG. 5(*b*) is a side view representing an assembled state of the embodiment illustrated in FIG. 5(*a*), and FIG. 5(*c*) is a side view referenced to explain a component formation in an embodiment in which the cartridge cap and a screw portion are used for attachment and detachment of the syringe.

The liquid material is stored in a resin-made barrel 261. A joint member 210 made of metal or resin and constituting the attachment part is connected to a barrel tip end. The joint member 210 includes an inner cylindrical portion having a small-diameter opening, an outer cylindrical portion surrounding the inner cylindrical portion, and a screw portion.

In use, the barrel 261 is inserted into a metal-made cartridge 263, and the cartridge 263 is closed by a metal-made cartridge cap 208. The cap 208 can be fixed using any of different types of mechanisms, i.e., the type latching a hook 209 in a hook slot 207 as illustrated in FIG. 5(*a*), or the type tightly engaging a cap screw portion 217 and a syringe screw portion 219 with each other as illustrated in FIG. 5(*c*). In the above case, the hook 209 or the syringe screw portion 219 constitutes the upper connection part 7. It is to be noted that the hook 209 is provided at two locations on the front side, as appearing on the drawing, and the rear side. A tube through which compressed gas is supplied is connected to the cap 208.

The cartridge type reservoir is suitable for the case where a large capacity (not less than, e.g., 100 mL) is desired. While FIG. 5 illustrates the resin-made barrel, by way of example, the cartridge type is further adaptable for a sealant that is filled in not only a tube made of a laminate or a metal foil and used for a commercially available adhesive, etc., but also a flexible tubular bag used for a commercially available caulking agent, etc. The cartridge type reservoir can also provide the advantageous effect of not causing twisting of the tube when the reservoir is attached to and detached from the discharge device. It is to be noted that the term "syringe" used in this Description includes the cartridge type reservoir as well.

Figure 2:
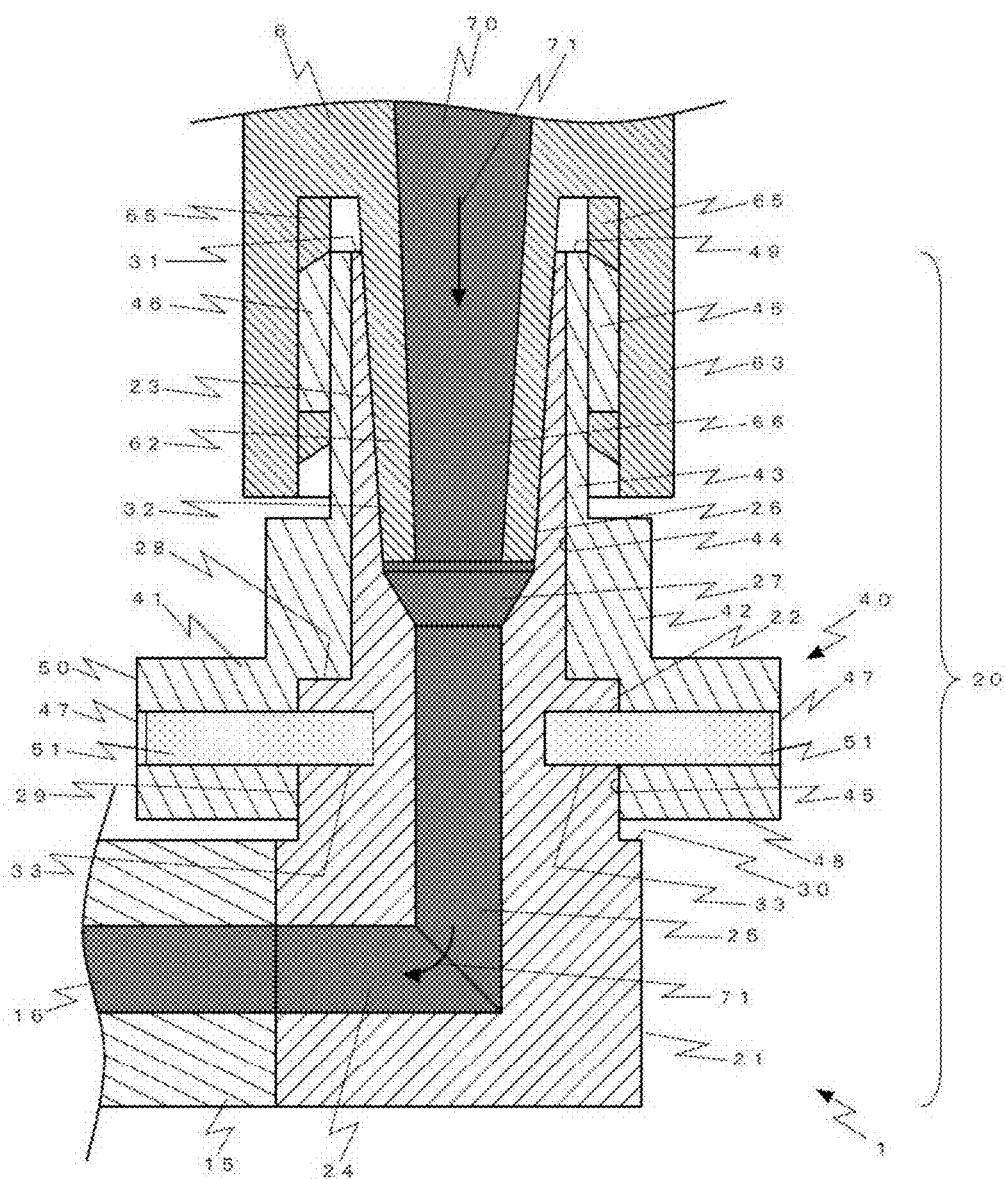
FIG. 2 is a side sectional view of the attachment/detachment mechanism according to the present invention.

Details of the attachment/detachment mechanism 1 according to the present invention will be described below. FIG. 2 is a sectional view of the attachment/detachment mechanism 1 according to the present invention.

The attachment/detachment mechanism 1 according to the present invention is mainly constituted by a support member 20 that is connected to the coupling member 15, and a rotation member 40 that is rotatably fitted over the support member 20.

Although the support member 20 is in the form of an integral metal-made member, a lower portion of the support member 20 is called a base portion 21, a middle portion positioned above the base portion 21 is called a support portion 22, and an upper portion is called an insertion portion 23. The base portion 21 has an L-shaped channel (24, 25) formed therein to establish communication between the syringe 6 and the coupling member 15, and it is connected to the coupling member 15. The support portion 22 is disposed above the base portion 21, and a shoulder 28 of the support portion 22 supports the rotation member 40. The insertion portion 23 is disposed above the support portion 22, and it has an upper insertion hole 26 into which the inner cylindrical portion 62 of the syringe 6 is inserted.

The L-shaped channel inside the base portion 21 is constituted by a connection-side channel 24 in communication with a channel 16 in the coupling member, and an inlet-side channel 25 in communication with the upper insertion hole 26. A mortar-shaped (inverted truncated conical) portion 27 is provided between the inlet-side channel 25 and the upper insertion hole 26. The connection-side channel 24 and the inlet-side channel 25 are communicated with each other in an orthogonal relation through a bent portion. The mortar-shaped portion 27 is provided to gradually and smoothly reduce a channel diameter from the upper insertion hole 26 toward the inlet-side channel 25. When the inlet-side channel 25 and the outlet channel 66 can be formed substantially in the same diameter, the mortar-shaped portion 27 may be omitted. Because the attachment parts of commercially available syringes have various shapes, it is also possible to prepare the plurality of base portions 21 having the upper insertion holes 26 in shapes adapted for a variety of attachment parts of the syringes, and to optionally use the prepared base portions 21 in combination with one or plural types of the rotation members 40.

The upper insertion hole 26 extending in the vertical direction defines a channel tapered downward, namely gradually spreading upward, such that an inner peripheral surface 32 of the upper insertion hole comes into a close contact with an outer peripheral surface 67 of the inner cylindrical portion of the syringe 6 substantially over the entirety of both the surfaces. In other words, in the illustrated embodiment, the inner peripheral surface 32 of the upper insertion hole has substantially the same taper gradient as that of the outer peripheral surface 67 of the inner cylindrical portion of the syringe 6. The liquid material 70, denoted by a region filled with a gray color in FIG. 2, is supplied from the outlet channel 66 of the syringe 6 toward the channel 16 in the coupling member in a direction of an arrow (denoted by a numeral 71).

The support portion 22 and the insertion portion 23 are in the form of continuous concentric columns, and the support portion 22 has a larger diameter than the insertion portion 23. Therefore, the shoulder 28 is formed at a connection boundary between the support portion 22 and the insertion portion 23. The rotation member 40 having through-holes (specifically, a through-hole 44 and a recess 45) is fitted over the support portion 22 and the insertion portion 23, and the fitted rotation member 40 is rotatably supported by the shoulder 28 of the support portion 22, the shoulder 28 having a relatively large diameter. Thus, the support portion 22 and the insertion portion 23 function like a shaft with respect to the rotation member 40.

An annular groove 33 is circumferentially formed to be recessed in a lateral surface 29 of the support portion 22. A slip-off preventive member 51 described later is fitted into the annular groove 33.

The rotation member 40 made of metal or resin includes an operating portion 41 positioned on the lower side, a barrel portion 42 positioned at a middle, and a prominent portion 43 positioned on the upper side. The barrel portion 42 and the prominent portion 43 are collectively called a raised portion in some cases.

The operating portion 41 is a disk-shaped member. The recess 45 which connects to the through-hole 44 is formed in a central region of a bottom surface 48 of the operating portion 41. The barrel portion 42 is a disk-shaped member having a smaller diameter than the operating portion 41, and the through-hole 44 is formed at the center of the barrel portion 42. Positioning of the rotation member 40 is made by fitting the rotation member 40 over the insertion portion 23 of the support member 20, starting from the bottom surface side of the recess 45, and by engaging the recess 45 with the support portion 22. Stated in another way, the through-holes (44 and 45) closely engaging with the support portion 22 and the insertion portion 23, which jointly form a stepped cylindrical column, are formed in the rotation member 40 in a concentric relation to a center axis of the rotation member 40. In this connection, the shoulder 28 is preferably formed at such a height as allowing a slight gap to be defined between the bottom surface 48 of the rotation member and an upper surface 30 of the base portion, and as not impeding the rotation of the rotation member 40.

A lateral insertion hole 47 penetrating through the operating portion 41 to be communicated with the recess 45 is formed to extend from a lateral surface 50 of the operating portion 41. The lateral insertion hole 47 is formed at the same height as the annular groove 33 of the support member 20. By inserting the slip-off preventive member 51 through the lateral insertion hole 47, it is ensured that the rotation member 40 can be prevented from slipping off from the support member 20. The slip-off preventive member 51 is a rod-like member having a length that is longer than an overall length of the lateral insertion hole 47, and that is shorter than a total of the overall length of the lateral insertion hole 47 and a depth of the annular groove 33. A diameter of the slip-off preventive member 51 is set to a value slightly smaller than a vertical width (from an upper surface to a lower surface) of the annular groove 33 in the support portion 22 such that the rotation of the rotation member 40 is not impeded.

On the other hand, the lateral insertion hole 47 of the operating portion 41 is preferably formed to have thread grooves or a fitting member, which is engageable with the slip-off preventive member 51, in order to make the slip-off preventive member 51 tightly fixed. While, in the illustrated embodiment, pairs of the lateral insertion holes 47 and the slip-off preventive members 51 are disposed at two locations opposite to each other with a rotation axis interposed therebetween, the present invention is not limited to such an example. The pairs of the lateral insertion holes 47 and the slip-off preventive members 51 may be disposed, for example, at three locations (in a Y-shape when viewed from above) or four locations (in a cross shape when viewed from above) at equal intervals.

The shape of the operating portion 41 is also not limited to a circle when viewed from above. Corresponding to the arrangement of the lateral insertion holes 47, the operating portion 41 may have, for example, an I-shape when viewed from above (in the case where the lateral insertion holes 47 are formed at two opposite locations), a Y-shape when viewed from above (in the case where the lateral insertion holes 47 are formed at three locations), or a cross shape when viewed from above (in the case where the lateral insertion holes 47 are formed at four locations). The lateral surface 50 of the operating portion is preferably given with anti-slip properties for the purpose of facilitating the operation. The lateral surface 50 may be treated with, e.g., knurling, pear-skin finishing, or sand blasting. A shape of the barrel portion 42 is also not limited to a circle when viewed from above. For example, the barrel portion 42 may have the same diameter as the prominent portion 43 (namely, the prominent portion 43 may be directly raised from the operating portion 41 without providing the barrel portion 42).

A screw portion 46 is formed in an outer peripheral surface of the prominent portion 43 and is engaged with the screw portion 65 formed in the inner surface of the attachment part 10 of the syringe 6. The screw portions (65 and 46) are each preferably in the form of a double thread screw or a luer connector. An upper end surface 49 of the rotation member and an upper end surface 31 of the support member are not always required to be positioned on the same plane. However, both the upper end surfaces 49 and 31 are preferably positioned on the same plane from the viewpoint of providing a guide to check whether the rotation member 40 is fitted up to a proper position.

The operating portion 41, the barrel portion 42, and the prominent portion 43 may be formed integrally, or they may be constituted by combining a plurality of members with each other.

As illustrated in FIG. 6, the discharge device 2 is mounted to a desktop type application apparatus 100, and is used in an operation of applying the liquid material onto a workpiece 106 while the discharge device 2 and a worktable 103 are moved relatively to each other by XYZ-axis drive devices (111, 112 and 113).

A numeral 111 denotes an X-axis drive device for the relative movement in an X-direction (denoted by a numeral 121), a numeral 112 denotes a Y-axis drive device for the relative movement in a Y-direction (denoted by a numeral 122), and a numeral 113 denotes a Z-axis drive device for the relative movement in a Z-direction (denoted by a numeral 123). For example, a servo motor, a combination of a stepping motor and a ball screw, a linear motor, or the like can be used as each of the XYZ-axis drive devices (111, 112 and 113). The above-mentioned drive devices are disposed on a base 105 in which an application control unit (not illustrated) for controlling operations of XYZ-axis drive devices is incorporated. Manual operation buttons 104 are disposed on an upper surface of the base 105. A dispense controller 101 is installed aside of the base 105, and compressed gas from a compressed gas source 102 is supplied to the syringe 6 under the desired conditions.

Unlike the illustrated embodiment, the application apparatus 100 may include the plurality of discharge devices 2. Even when the plurality of discharge devices 2 are arranged in a state where the respective coupling members 15 are positioned parallel to each other, the attachment/detachment mechanism 1 according to the present invention can avoid the upper connection part 7 of one discharge device from contacting the upper connection part 7 of another adjacent discharge device. Therefore, an installation space for the plurality of discharge devices 2 can be minimized. The attachment/detachment mechanism 1 according to the present invention is particularly advantageous when used in a desktop type application apparatus for which space-saving is demanded strongly. However, it is a matter of course that the attachment/detachment mechanism 1 according to the present invention is applicable to a non-desktop type application apparatus as well.

<Operation>

The operation of the attachment/detachment mechanism 1 according to the present invention will be described below.

Figure 3:
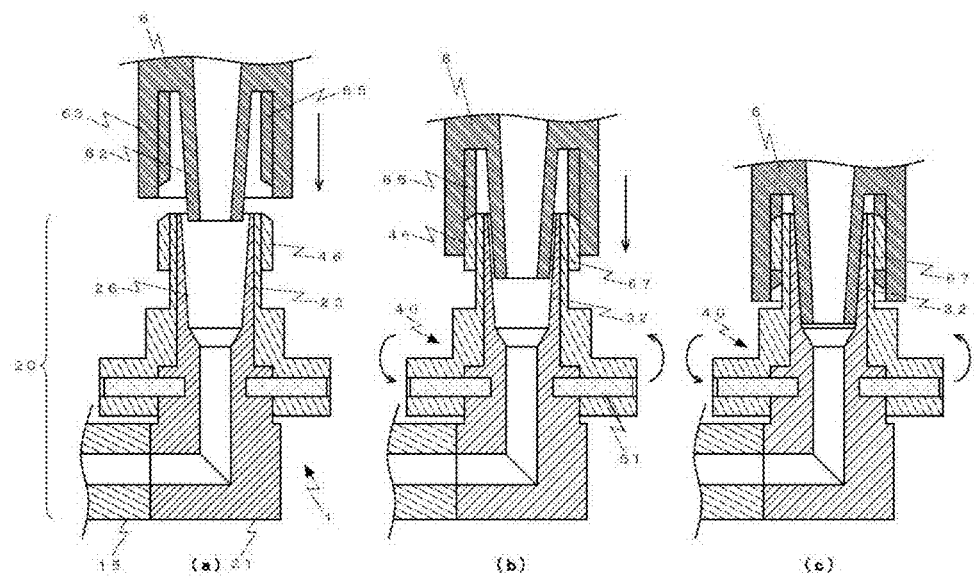
FIG. 3 is a side sectional view referenced to explain an operation of the attachment/detachment mechanism according to the present invention when a syringe is attached. More specifically, (a) of FIG. 3 represents a state where the attachment of the syringe is started, (b) of FIG. 3 represents a state where screw portions on both sides are engaged with each other, and (c) of FIG. 3 represents a state where tapered portions on both sides are closely contacted with each other.

FIG. 3 is an explanatory view referenced to explain the operation of the attachment/detachment mechanism 1 according to the present invention when the syringe 6 is attached.

(a) First, the inner cylindrical portion 62 of the syringe 6 is inserted into the upper insertion hole 26 of the support member 20, and the syringe 6 is moved downward until the screw portion 65 of the syringe 6 and the screw portion 46 of the rotation member 40 are contacted with each other (see FIG. 3(*a*)).

(b) Then, when the rotation member 40 is rotated in a screw-tightening direction, the screw portion 65 of the syringe 6 and the screw portion 46 of the rotation member 40 are engaged with each other, and the syringe 6 starts to be moved downward by the screwing action (see FIG. 3(*b*)). At that time, the screw portions (65 and 46) can be smoothly engaged with each other by rotating the rotation member 40 while applying a force to push the syringe 6 downward. On that occasion, with the provision of the slip-off preventive member 51, the rotation member 40 is just rotated at the set position without moving upward by the screwing action. In other words, only the syringe 6 is moved downward by the screwing action, and the other members are not moved upward. In the above operation, since the syringe 6 is just moved downward and is not rotated, orientations of the upper connection part 7 of the syringe 6 and the adapter 8 can be adjusted, and the upper connection part 7 and the adapter 8 can be fixedly held at the desired orientation through procedures described below. At this point of time, the tapered inner peripheral surface 32 of the upper insertion hole of the support member 20 and the tapered outer peripheral surface 67 of the inner cylindrical portion of the syringe 6 are not yet contacted with each other.

(c) When the rotation member 40 is further rotated, the syringe 6 continues to be moved downward by the screwing action. Eventually, the tapered inner peripheral surface 32 of the upper insertion hole of the support member 20 and the tapered outer peripheral surface 67 of the inner cylindrical portion of the syringe 6 are contacted with each other, whereupon the downward movement of the syringe 6 is stopped (see FIG. 3(*c*)). On that occasion, because the syringe 6 is fixed with the tapered surfaces (67 and 32) functioning like wedges, the rotation member 40 cannot be rotated any more. This provides another advantage that an operator can easily check whether the syringe 6 has been fixed or not. Moreover, since the tapered surfaces (67 and 32) are surface-contacted with each other and are fixedly held by the engagement between the screw portions (65 and 46), the syringe 6 is not slipped off even when pressure is applied to the liquid material 70 by the compressed gas. Furthermore, the tapered surfaces (67 and 32) act like seals, and the liquid material 70 is prevented from leaking through the interface between the tapered surfaces (67 and 32). In other words, there is no need of separately arranging a sealing member such as an O-ring.

Though not illustrated, the syringe 6 may be detached through operation procedures that are reversed to the above-described ones. Also in the case of detaching the syringe 6, the syringe 6 can be moved (upward in the case of the detachment) just by rotating the rotation member 40 without rotating the syringe 6.

As described above, with the attachment/detachment mechanism according to the present invention, the syringe can be attached and detached just by rotating the rotation member without rotating the syringe, it is possible to prevent not only twisting of a tube connected to the syringe, but also damage of the syringe itself.

Furthermore, an overall width of the discharge device can be held relatively small by adjusting the orientations of the upper connection part and the adapter.

LIST OF REFERENCE SIGNS

1: attachment/detachment mechanism, 2: discharge device (dispenser), 3: pump section, 4: pump drive section, 5: nozzle, 6: reservoir (syringe), 7: upper connection part, 8: adapter, 9: compressed gas supply tube, 10: attachment part, 15: coupling member, 16: channel in coupling member, 17: fixing member, 20: support member, 21: base, 22: support portion, 23: insertion portion, 24: connection-side channel, 25: inlet-side channel, 26: upper insertion hole, 27: mortar-shaped portion, 28: shoulder (upper surface of support portion), 29: lateral surface of support portion, 30: upper surface of base, 31: upper end surface of support member, 32: inner peripheral surface of insertion hole, 33: annular groove, 40: rotation member, 41: operating portion, 42: barrel portion, 43: prominent portion, 44: through-hole, 45: recess, 46: screw portion of the rotation member, 47: lateral insertion hole, 48: bottom surface (of rotation member), 49: upper end surface of rotation member, 50: lateral surface of operating portion, 51: slip-off preventive member, 61: storage cylinder, 62: inner cylindrical portion, 63: outer cylindrical portion, 64: connection groove, 65: syringe screw portion, 66: outlet channel, 67: outer peripheral surface of inner cylindrical portion, 68: small-diameter opening, 70: liquid material, 71: direction in which liquid material is supplied, 72: flange, 100: application apparatus, 101: dispense controller (discharge control unit), 102: compressed gas source, 103: worktable, 104: manual operation button, 105: base, 106: workpiece, 111: X-axis drive device, 112: Y-axis drive device, 113: Z-axis drive device, 121: X moving direction, 122: Y moving direction, 123: Z moving direction, 206: reservoir (syringe), 207: hook slot, 208: cartridge cap, 209: hook, 210: joint member (attachment part), 217: cap screw portion, 219: syringe screw portion, 261: barrel, and 263: cartridge

The invention claimed is:

1. A syringe attachment/detachment mechanism for a discharge device, wherein a syringe including an attachment part and an upper connection part is attached to the discharge device through screwing,
wherein the attachment part includes an inner cylindrical portion having an outlet opening, an outer cylindrical portion surrounding the inner cylindrical portion, and a screw portion,
the attachment/detachment mechanism includes a support member nonrotatably fixed to the discharge device and including a cylindrical part having an opening into which the inner cylindrical portion is inserted, the support member having a channel formed therein for communication between the outlet opening and a nozzle of the discharge device,
the attachment/detachment mechanism includes a rotation member rotatably fitted on an outer surface of the cylindrical part of the support member so as to rotate about an axis of the cylindrical part, the rotation member including a screw portion engaging with the screw portion of the attachment part, and
the syringe is attached to the discharge device with rotation of the rotation member.

2. The syringe attachment/detachment mechanism according to claim 1, wherein the support member has an annular groove formed in a lateral peripheral surface thereof,
the rotation member has a lateral insertion hole positioned in an opposing relation to the annular groove, and
the attachment/detachment mechanism further includes one or more slip-off preventers each extending through both the lateral insertion hole and the annular groove.

3. The syringe attachment/detachment mechanism according to claim 1, wherein the inner cylindrical portion has a tapered outer peripheral surface becoming thinner toward the outlet opening, and
the cylindrical part is provided with an upper insertion hole having a tapered inner peripheral surface that is contacted with the tapered outer peripheral surface of the inner cylindrical portion.

4. The syringe attachment/detachment mechanism according to claim 1, wherein the support member includes a support portion having a larger diameter than the cylindrical part, and
the rotation member includes a raised portion having a through-hole into which the cylindrical part is inserted, an operating portion having a larger diameter than the raised portion, and a recess into which the support portion is fitted.

5. The syringe attachment/detachment mechanism according to claim 4, wherein a lateral surface of the operating portion is treated with a process for anti-slipping.

6. A discharge device comprising:
a nozzle having a discharge port;
a liquid chamber that is communicated with the discharge port, and that is supplied with a liquid material;
a main body including the liquid chamber formed therein;
a coupling member connected to the main body and including a channel formed therein to be communicated with the nozzle;
a propulsion force applier arranged in the liquid chamber and giving a propulsion force necessary for discharge to the liquid material;
a propulsion-force applier driver configured to operate the propulsion force applier; and a discharge controller,
wherein the discharge device includes the syringe attachment/detachment mechanism according to claim 1.

7. An application apparatus comprising the discharge device according to claim 6;
a compressed gas source that supplies compressed gas for applying pressure to a syringe;
the syringe including an attachment part and an upper connection part, and being attached to the syringe attachment/detachment mechanism through screwing;
an adapter connected to a tube that communicates the syringe and the compressed gas source with each other, and being mounted to the upper connection part;
a worktable on which an application object is placed;
XYZ-axis drive devices that relatively move the discharge device and the worktable; and
an application controller that controls operations of the XYZ-axis drive devices.

8. The application apparatus according to claim 7, wherein the upper connection part of the syringe is constituted by an elongate flange extending in one straight line.

9. The application apparatus according to claim 7, wherein the discharge device is constituted by a plurality of discharge devices arranged in such a state that coupling members of respective discharge devices are positioned parallel to each other.

* * * * *